United States Patent [19]

Gillingham et al.

[11] Patent Number: 4,827,787

[45] Date of Patent: May 9, 1989

[54] MECHANICAL TRANSMISSION LOCKING MECHANISM

[75] Inventors: Gary D. Gillingham, Cherry Valley; Craig G. Milius, Rockford, both of Ill.

[73] Assignee: Sundstrand Corporation, Rockford, Ill.

[21] Appl. No.: 947,627

[22] Filed: Dec. 30, 1986

[51] Int. Cl.$^4$ .................... F16H 57/10; B23B 29/24; B23Q 17/00; F16B 2/02

[52] U.S. Cl. ................... 74/411.5; 74/813 L; 188/70 R

[58] Field of Search ............. 74/813 L, 814, 411.5, 74/626, 785, 7 A; 188/70 R

[56] References Cited

U.S. PATENT DOCUMENTS

| | | | |
|---|---|---|---|
| 1,906,219 | 4/1933 | Osgood | 74/785 |
| 1,969,035 | 8/1934 | Rice et al. | 74/411.5 |
| 3,115,791 | 12/1963 | Dean | 74/785 |
| 3,406,595 | 10/1968 | Tullis | 74/814 |
| 3,618,427 | 11/1971 | Schoepe | 74/824 |
| 3,633,719 | 1/1972 | Lynch . | |
| 3,762,242 | 10/1973 | Swezey | 74/813 L |
| 4,183,270 | 1/1980 | Castagne | 74/813 L |
| 4,310,087 | 1/1982 | Gawler . | |
| 4,315,585 | 2/1982 | Seitz . | |
| 4,441,379 | 4/1984 | Malkowski et al. | 74/477 |
| 4,464,948 | 8/1984 | Lindemeyer | 74/813 L |
| 4,503,899 | 3/1985 | Forquer . | |
| 4,586,393 | 5/1986 | Mooney et al. | 74/411.5 |
| 4,653,739 | 3/1987 | Moore | 74/813 L |

*Primary Examiner*—Lawrence Staab
*Assistant Examiner*—Joseph J. Meter
*Attorney, Agent, or Firm*—Wood, Dalton, Phillips, Mason & Rowe

[57] ABSTRACT

In order to lock a drive system from operation during maintenance procedures, while providing a positive mechanical engagement regardless of index position, a locking mechanism includes a sector gear associated with a rotatably mounted shaft. The rotatably mounted shaft and the sector gear have a common axis of rotation which extends generally tangentially of a system gear associated with a mechanical transmission of the drive system. With the system gear being mounted for rotation in a plane and having a plurality of equally spaced teeth completely about the periphery thereof, the sector gear also includes a plurality of equally spaced teeth, but disposed about only a portion of the periphery thereof. The rotatably mounted shaft is disposed in spaced relation to the teeth of the system gear and the sector gear is mounted for rotation into and out of the plane of the system gear. Moreover, the locking mechanism includes a lost motion mechanism accommodating limited relative rotation between the rotatably mounted shaft and the sector gear and also includes a cam accommodating limited axial movement of the sector gear relative to the rotatably mounted shaft, whereby the teeth of the sector gear are automatically aligned during rotation for meshing enagagement with the teeth of the system gear.

22 Claims, 5 Drawing Sheets

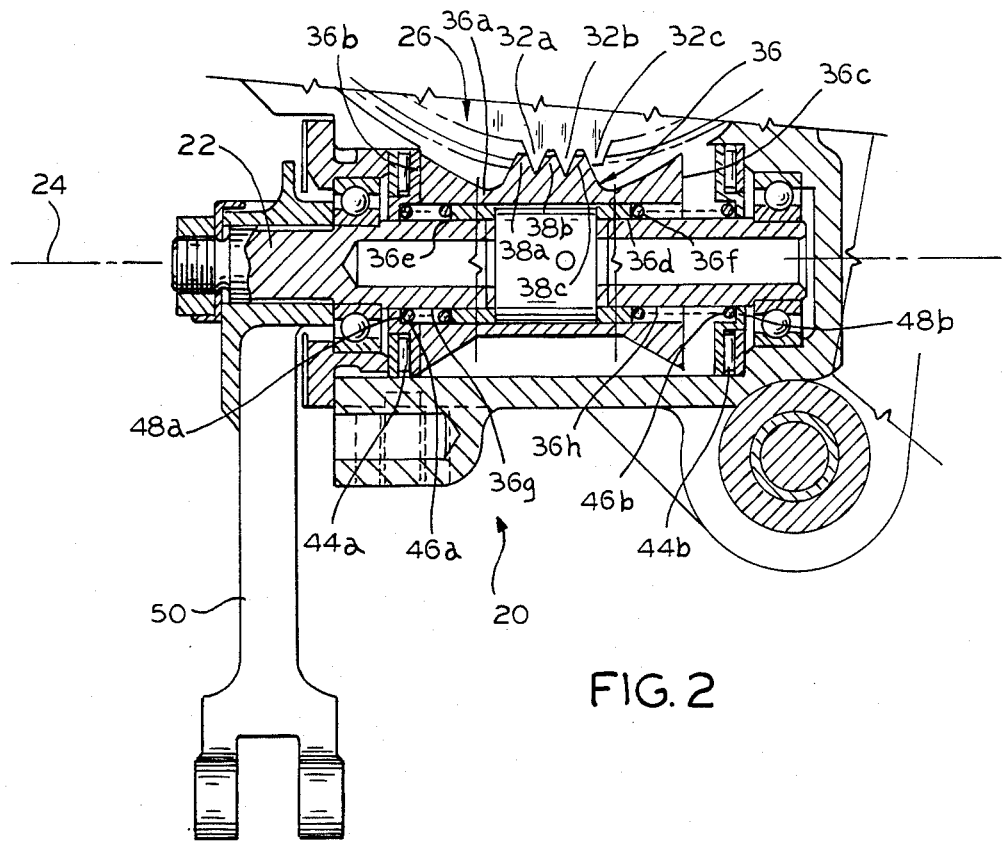
FIG. 2
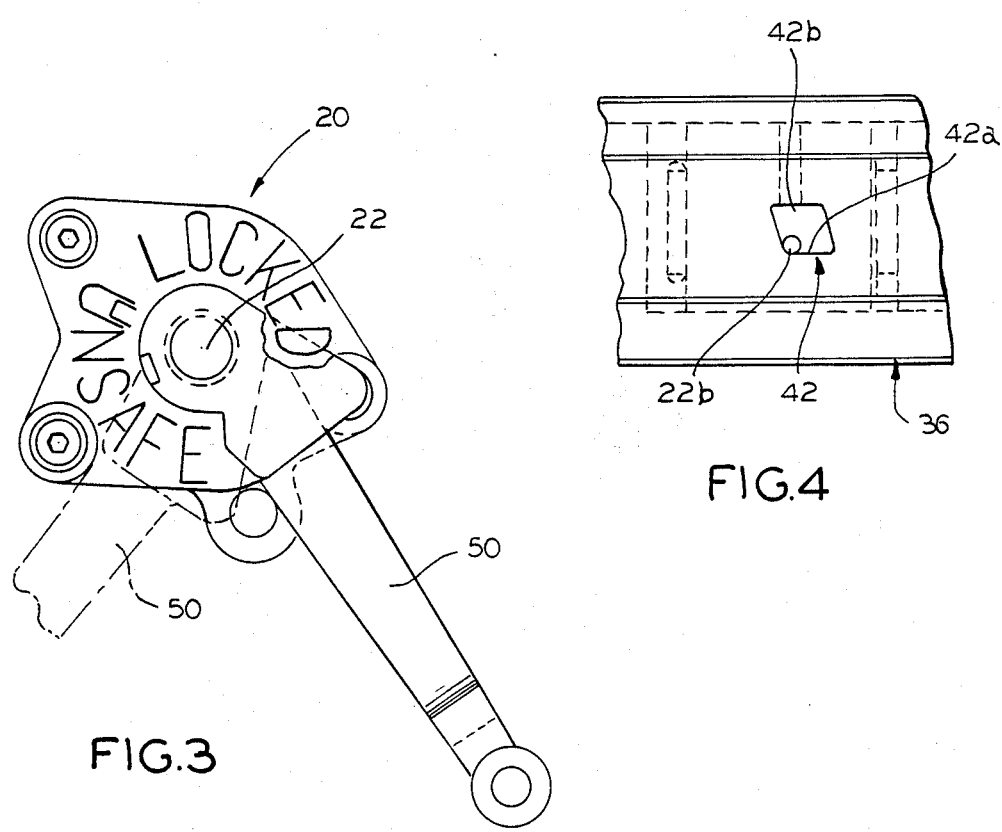
FIG. 3
FIG. 4

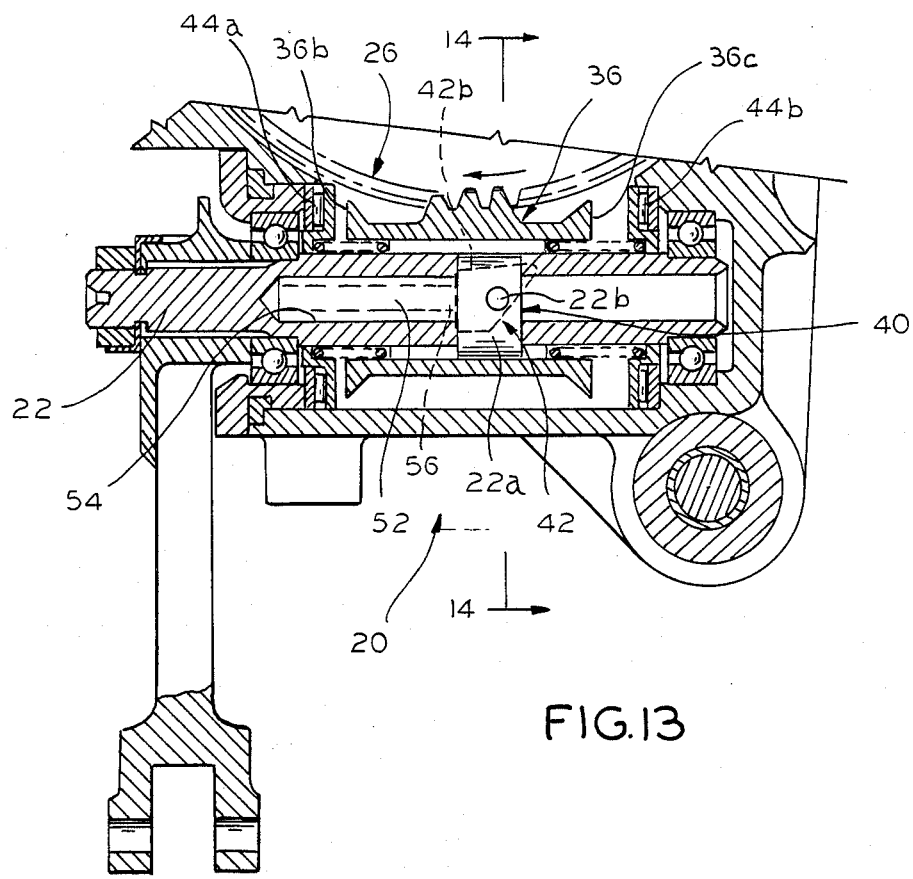
FIG.13
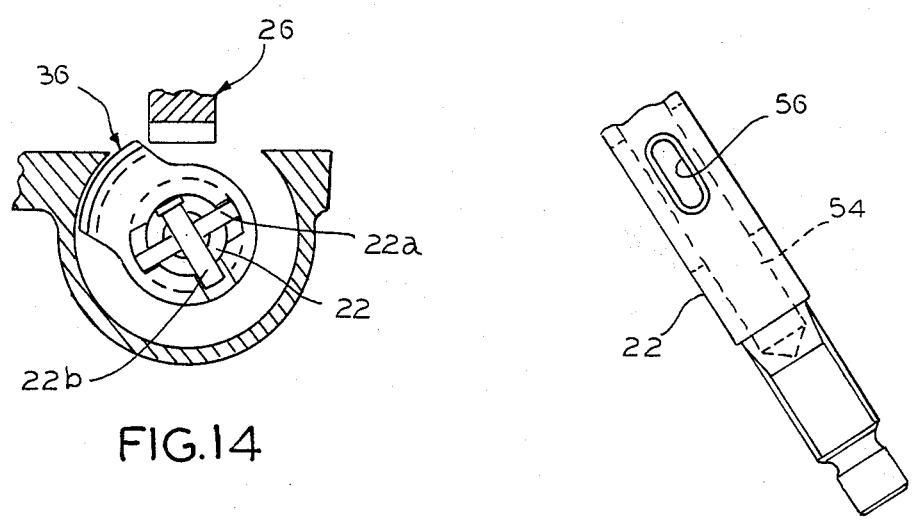
FIG.14
FIG.15

MECHANICAL TRANSMISSION LOCKING MECHANISM

FIELD OF THE INVENTION

The present invention relates to mechanical transmissions in drive systems requiring a lockout feature and, more particularly, to a locking mechanism for a mechanical transmission of a drive system.

BACKGROUND OF THE INVENTION

Drive systems are well known in a wide variety of diverse applications. They often times utilize mechanical transmissions that are highly effective for the intended purpose but which, nevertheless, could prove dangerous particularly during maintenance procedures. Specifically, the mechanical transmission could cause serious injury if inadvertently engaged at such times.

One particular application which is illustrative of this problem involves an aircraft cargo door. Such doors utilize mechanical actuation systems driven by power drive units that require a ground check-out by skilled personnel. If others are unaware of the presence of such skilled personnel, the actuation system could inadvertently be operated at an instant that would cause serious injury.

To overcome such problems, manual lockouts have been proposed in various forms. For instance, Lindemeyer U.S. Pat. No. 4,464,948 is directed to a locking mechanism for an indexing device which utilizes an eccentric cam fixed from axial movement but rotatably mounted on a spindle whereby camming surfaces inclined toward one another engage opposing surfaces of adjacent gear teeth of the drive system. Unfortunately, the Lindemeyer '948 patent is unsatisfactory because it will not engage regardless of the relative position of the gear teeth and the eccentric cam.

Similarly, Schoepe U.S. Pat. No. 3,618,427 discloses a mechanism for locking a turret of a machine tool. This is accomplished by interference of teeth on a rack with gear teeth. Once again, however, the Shoepe '427 patent only allows locking to occur at discreet positions.

Still other locking mechanisms are disclosed in Forquerus U.S. Pat. No. 4,503,899 and Malkowski et al U.S. Pat. No. 4,441,379. Nevertheless, it has remained to provide a mechanical transmission locking device that will engage every time without regard to position. In other words, earlier attempts to provide lockouts have failed to accomplish the objective of positive locking at an infinite number of positions. More specifically, it has remained to provide a locking mechanism which is automatically self-aligning regardless of position. On the contrary, manual lockouts have required discreet relative positioning for locking engagement.

The present invention is directed to overcoming the above stated problems and accomplishing the stated objects.

SUMMARY OF THE INVENTION

Accordingly, the present invention is directed to a locking mechanism for a mechanical transmission of a drive system. The drive system is of a type which includes system gear means associated with the mechanical transmission. The system gear means has a plurality of equally spaced teeth completely about the periphery thereof and has an axis of rotation about which it is mounted for rotation in a plane. A rotatably mounted shaft is disposed in spaced relation to the teeth of the system gear means. The rotatably mounted shaft extends generally tangentially of the system gear means and has an axis of rotation about which it is mounted for rotation in the plane of the system gear means. The locking mechanism also includes sector gear means associated with the rotatably mounted shaft and comprising a plurality of equally spaced teeth about a portion of the periphery thereof. With this arrangement, the sector gear means has an axis of rotation, preferably comprising the axis of rotation of the rotatably mounted shaft, about which it is mounted for rotation into and out of the plane of the system gear means.

In the exemplary embodiment, lost motion means is associated with the rotatably mounted shaft and the sector gear means. The lost motion means accommodates limited rotation of the rotatably mounted shaft relative to the sector gear means and otherwise accommodates rotation of the sector gear means with the rotatably mounted shaft. Cam means is also associated with the rotatably mounted shaft and the sector gear means. The cam means accommodates limited axial movement of the sector gear means relative to the rotatably mounted shaft during rotation of the rotatably mounted shaft and the sector gear means. By so doing, the cam means accommodates tangential movement of the teeth of the sector gear means relative to the teeth of the system gear means.

With this arrangment, the teeth of the sector gear means are automatically aligned during rotation for meshing engagement with the teeth of the system gear means. It is also advantageous for the sector gear means to comprise a sector worm gear with the rotatably mounted shaft extending completely through the sector worm gear which includes an elongated body portion having spaced opposing ends. More specifically, the teeth of the sector worm gear are preferably disposed on the elongated body portion intermediate the spaced opposing ends.

In the preferred embodiment, a pair of thrust bearings are mounted in confronting relation to the spaced opposing ends of the elongated body portion. The thrust bearings are spaced by a distance greater than the overall length of the elongated body portion such that one of the spaced opposing ends can be provided with a bearing surface adapted to engage one of the thrust bearings and the other of the spaced opposing ends can be provided with a bearing surface adapted to engage the other of the thrust bearings. Additionally, the locking mechanism preferably includes first and second biasing means cooperating with the spaced opposing ends for axially biasing the elongated body portion in opposite directions.

In the preferred embodiment, a bore in the elongated body portion has an internal spline and the rotatably mounted shaft has an external spline. The external spline is advantageously disposed within the internal spline to define the lost motion means. Preferably, the internal spline is an arcuate groove in the bore and the external spline is a pin extending outwardly into the arcuate groove.

Also, in the preferred embodiment, the bore in the elongated body portion includes a cam surface and the rotatably mounted shaft includes a camming member. The camming member is advantageously in engagement with the cam surface to define the cam means. Preferably, the cam surface is defined by a cam angled window within the bore and the camming member is a pin extending outwardly into the cam angled window.

Furthermore, in the preferred embodiment, the rotatably mounted shaft has a spring disposed in an axially extending bore and also has an axially extending slot in communication with the bore to receive the pin of the cam means which is adapted for movement in the slot against the biasing force of the spring. More specifically, the pin of the cam means extends through the pin of the lost motion means so as to move together when the system gear means is subjected to an external torque against the biasing force of the spring in the rotatably mounted shaft.

Other objects, advantages and features of the present invention will become apparent from the following specification taken in connection with the accompanying drawings.

BRIEF DESCRIPTION OF THE DRAWINGS

FIG. 2 is a cross-sectional view of the locking mechanism of FIG. 1;

FIG. 3 is an end view of the locking mechanism of FIG. 2;

FIG. 4 is a cross-sectional view taken on the line 4—4 of FIG. 1;

FIG. 13 is a cross-sectional view of the locking mechanism similar to FIG. 2 but illustrating an alternative embodiment;

FIG. 14 is a cross-sectional view taken on the line 14—14 of FIG. 13;

FIG. 15 is a rotatably mounted shaft for the embodiment illustrated in FIGS. 13 and 14;

DETAILED DESCRIPTION OF THE PREFERRED EMBODIMENT

Figure 1:
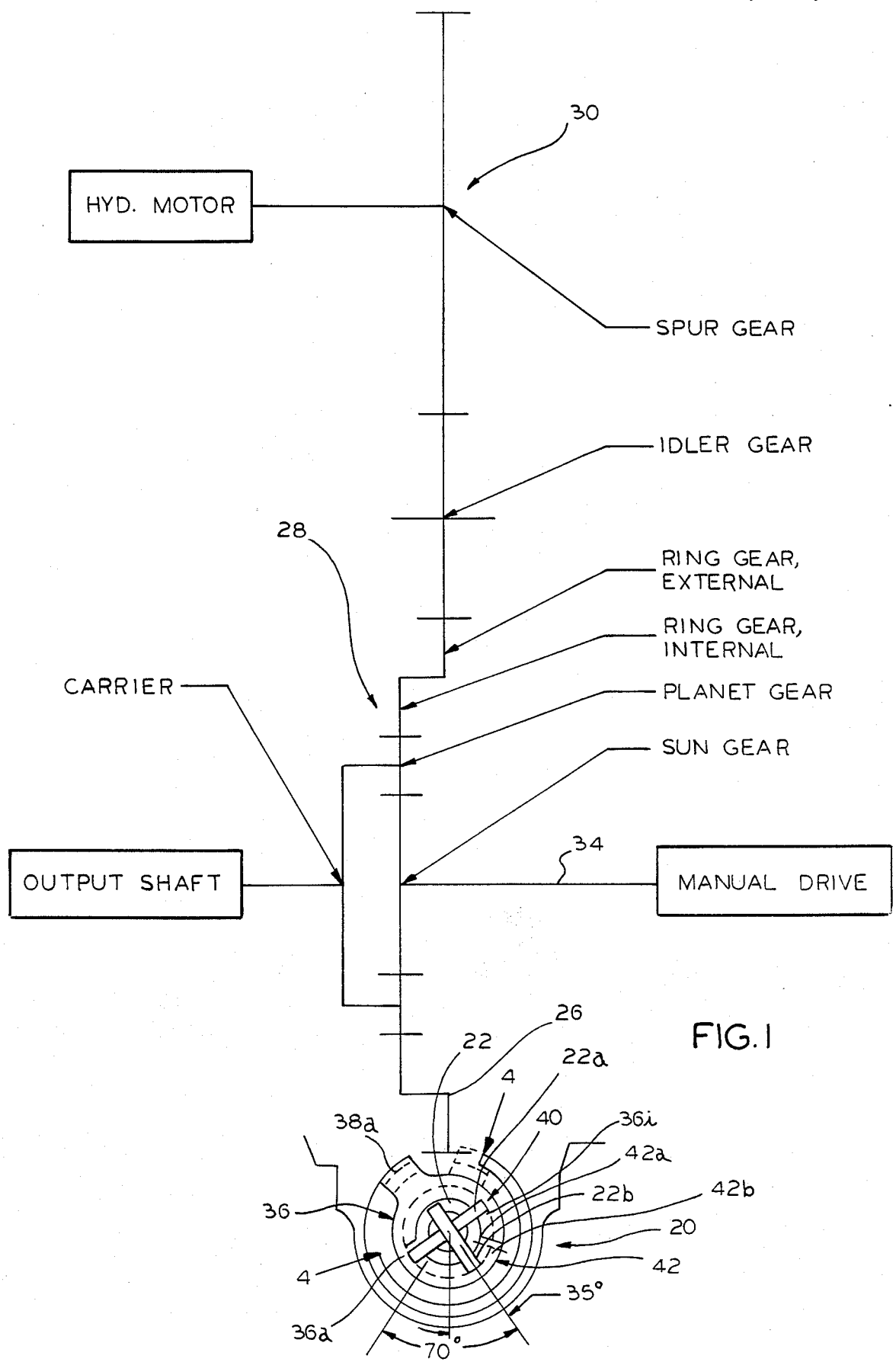
FIG. 1 is a schematic view, partially in cross-section, illustrating a locking mechanism for a mechanical transmission of a drive system in accordance with the present invention.
Figure 5:
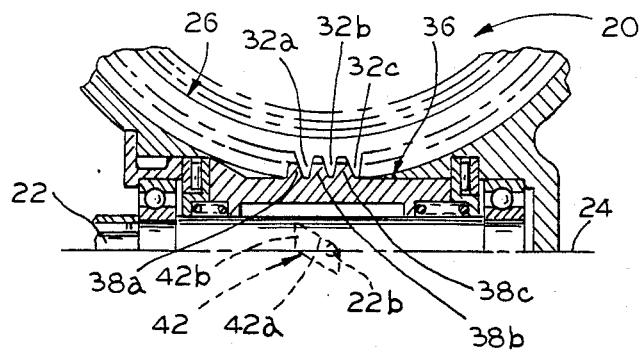
FIG. 5 is a cross-sectional view similar to FIG. 2 illustrating the locking mechanism in a disengaged position.

An exemplary embodiment of a locking mechanism for a mechanical transmission of a drive system is illustrated in FIGS. 1 and 2. The locking mechanism 20 includes a rotatably mounted shaft 22 having an axis of rotation 24 and being mounted for rotation in the plane of a system gear means 26. As shown, the system gear means 26 is associated with a mechanical transmission 28 of a drive system 30.

Referring specifically to FIGS. 1 and 2, the system gear means 26 includes a plurality of equally spaced teeth 32a, 32b, 32c, etc. completely about the periphery thereof. It will also be seen that the system gear means 26 has an axis of rotation 34 which extends generally perpendicularly to the plane in which the system gear means 26 is mounted for rotation. Additionally, the rotatably mounted shaft 22 is disposed such that the axis of rotation 24 extends generally tangentially of the system gear means 26 in spaced relation to the teeth 32a, 32b, 32c, etc. of the system gear means 26.

As shown in FIG. 2, the locking mechanism 20 includes sector gear means 36 associated with the rotatably mounted shaft 22 and including a plurality of equally spaced teeth 38a, 38b, 38c about a portion of the periphery thereof (see, also, FIG. 1). Moreover, the sector gear means 36 has a common axis of rotation 24 with the rotatably mounted shaft 22 and is mounted such that the teeth 38a, 38b, 38c are adapted for rotation into and out of the plane of rotation of the system gear means 26.

As best shown in FIGS. 1, 6, 8, 10 and 12, the locking mechanism 20 includes lost motion means 40 associated with the rotatably mounted shaft 22 and the sector gear means 36. The lost motion means 40 accommodates limited rotation of the rotatably mounted shaft 22 relative to the sector gear means 36. Moreover, the lost motion means 40 otherwise accommodates rotation of the sector gear means 36 with the rotatably mounted shaft 22, as will be described in detail hereinafter.

As best shown in FIGS. 4, 5, 7, 9 and 11, the locking mechanism 20 includes cam means 42 associated with the rotatably mounted shaft 22 and the sector gear means 36. The cam means 42 accommodates limited axial movement of the sector gear means 36 relative to the rotatably mounted shaft 22 during rotation of the rotatably mounted shaft 22 and the sector gear means 36. Moreover, the cam means 42 thereby accommodates tangential movement of the teeth 38a, 38b, 38c of the sector gear means 36 relative to the teeth 32a, 32b, 32c, etc. of the system gear means 26.

As will be appreciated, the sector gear means 36 comprises a sector worm gear which includes an elongated body portion 36a having spaced opposing ends 36b and 36c. The rotatably mounted shaft 22 extends completely through a bore 36d in the elongated body portion 36a of the sector worm gear 36. With this arrangement, the teeth 38a, 38b, 38c are preferably disposed on the elongated body portion 36a intermediate the spaced opposing ends 36b and 36c.

As best shown in FIG. 2, a pair of thrust bearings 44a and 44b are mounted in confronting relation to the spaced opposing ends 36b and 36c of the elongated body portion 36a. The thrust bearings 44a and 44b are spaced by a distance greater than the overall length of the elongated body portion 36a such that one of the spaced opposing ends 36b has a bearing surface adapted to engage one of the thrust bearings 44a and the other of the spaced opposing ends 36c has a bearing surface adapted to engage the other of the thrust bearings 44b. As will be appreciated by referring to FIGS. 2, 5, 7, 9 and 11, only one of the bearing surfaces on the spaced opposing ends 36b and 36c will be in engagement with the corresponding one of the thrust bearings 44a and 44b at any one time.

Referring once again to FIG. 2, the locking mechanism 20 includes first biasing means in the form of a compression spring 46a cooperating with one of the spaced opposing ends 36b for axially biasing the elongated body portion 36a in one direction and second biasing means in the form of a second compression spring 46b cooperating with the other of the spaced opposing ends 36c for axially biasing the elongated body portion 36a in the other direction. It will be seen that the compression springs 46a and 46b are preferably disposed about the rotatably mounted shaft 22 so as to extend between circumferentially extending flanges 48a and 48b, respectively, of the thrust bearings 44a and 44b, and surfaces 36e and 36f, respectively, defined by circumferentially extending undercuts 36g and 36h in the elongated body portion 36a. As will be readily apparent from the drawings, the first and second compression springs 46a and 46b are confined between the rotatably mounted shaft 22 on the one hand and the circumferentially extending flanges 48a and 48b of the thrust bearings 44a and 44b and the surfaces 36e and 36f in the elongated body portion 36a on the other hand within the circumferentially extending undercuts 36g and 36h.

Referring once again to FIGS. 1, 6, 8, 10 and 12, the details of construction and operation of the lost motion means 40 can be better understood. It will be seen that the bore 36d within the elongated body member 36a has an internal spline 36i and the rotatably mounted shaft 22 has an external spline 22a arranged such that the external spline 22a is disposed within the internal spline 36i. Specifically, the internal spline 36i is an arcuate groove and the external spline 22a is a pin extending outwardly into the arcuate groove 36i.

Referring now to FIGS. 1, 4, 5, 7, 9 and 11, the details of construction and operation of the cam means 42 can be better understood. It includes a cam surface 42a in the bore 36d of the elongated body member 36a and a camming member 22b on the rotatably mounted shaft 22 which is disposed in engagement with the cam surface 42a. With this arrangement, the cam surface 42a is defined by a cam angled window 42b and the camming member 22b is a pin extending outwardly into the can angled window 42b.

Referring to FIG. 1, the locking mechanism 20 is advantageously utilized with a mechanical transmission 28 of a drive system 30. The particular system illustrated is a door actuation system for the cargo door of an aircraft which utilizes a hydraulic motor to drive a spur gear which, in turn, drives an idler gear which then drives an external ring gear comprising the system gear means 26 hereinabove described. As shown, the external ring gear 26 drives an output shaft through a planet gear and a carrier.

Still referring to FIG. 1, it will be seen that a manual drive can be provided. This manual drive can drive the output shaft through a sun gear and the planet gear and carrier, as before. However, if the locking mechanism 20 is engaged, the hydraulic motor cannot drive the output shaft but the manual drive can drive the output shaft.

With regard to the operation of the locking mechanism 20, reference is first made to FIGS. 2, 3, 5 and 6. It will be appreciated that engagement of the locking mechanism 20 begins by rotating the crank lever 50 which in turn rotates the rotatably mounted shaft 22. The sector worm gear 36 will also rotate until interference of the respective teeth 32a, 32b, 32c, etc. and 38a, 38b, 38c occurs (see FIGS. 7 and 8) at which time, as rotation is continued, the pin 22b will contact the cam angled window 42b which will force the sector worm gear 36 (compare FIGS. 5 and 7) axially until the teeth 38a, 38b, 38c find gaps in the teeth 32a, 32b, 32c, etc. When this occurs, the sector worm gear 36 will continue to rotate (see FIGS. 9 and 10).

Figure 11:
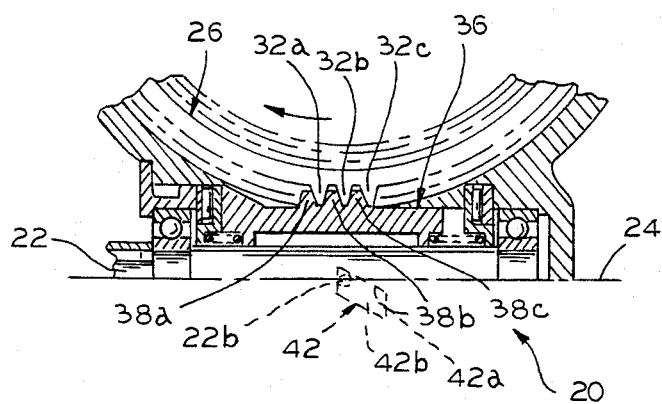
FIG. 11 is a cross-sectional view similar to FIG. 2 illustrating the locking mechanism in a fully locked position.
Figure 12:
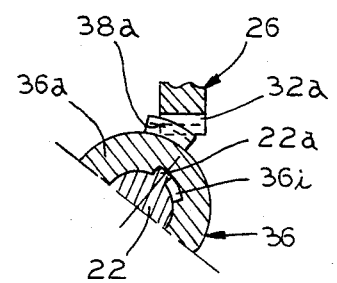
FIG. 12 is a cross-sectional view illustrating the relative position of the components of FIG. 11.

If torque is thereafter applied to the system gear means 26, e.g., through the manual drive, sun gear and planet gear, the sector worm gear 36 will be forced further into engagement with the system gear means 26 (see FIGS. 11 and 12). Moreover, the load is directly grounded to the housing via the sector worm gear 36 and the thrust bearings, either 44a or 44b and, as will be appreciated, the arcuate groove 36i and the pin 22a, i.e., the internal and external splines, accommodate the lost motion function (compare FIGS. 8 and 10 with FIG. 12).

In order to disengage the locking mechanism 20, the crank lever 50 is rotated in the reverse direction. The relative position of the pin 22a in engagement with one end of the arcuate groove 36i results in positive disengagement forcing the sector worm gear 36 out of mesh as the crank lever 50 is rotated. As a result, the locking mechanism 20 can quickly be disengaged when it is desired to return to a normal operating mode.

Figure 6:
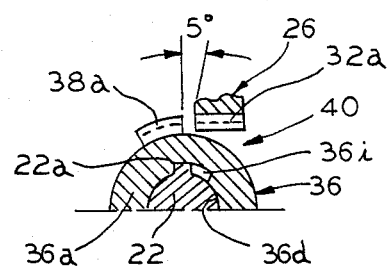
FIG. 6 is a cross-sectional view illustrating the relative position of the components of FIG. 5.
Figure 7:
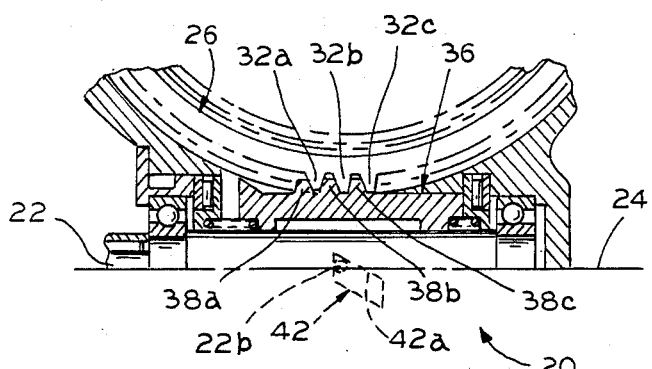
FIG. 7 is a cross-sectional view similar to FIG. 2 illustrating the locking mechanism approaching an engaged position.
Figure 8:
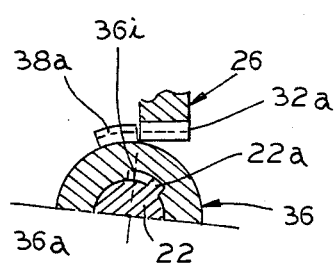
FIG. 8 is a cross-sectional illustrating the relative position of the components of FIG. 7.
Figure 9:
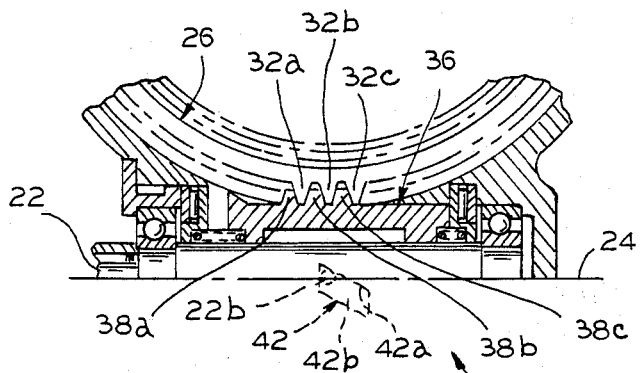
FIG. 9 is a cross-sectional view similar to FIG. 2 illustrating the locking mechanism in an engaged position.
Figure 10:
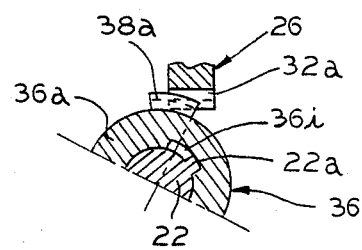
FIG. 10 is a cross-sectional view illustrating the relative position of the components in FIG. 9.

In one specific embodiment, the angle between the teeth 32a, 32b, 32c, etc. and the teeth 38a, 38b, 38c in a disengaged position is five (5) degrees (see FIG. 6). Thus, the locking mechanism must rotate five (5) degrees in order to reach the point of interference between the teeth 32a, 32b, 32c, etc. and the teeth 38a, 38b, 38c and rotation must continue for an additional ten (10) degrees, i.e., the length of the arcuate slot 36i, to find a gap in the teeth 32a, 32b, 32c, etc. Finally, the locking mechanism 20 must be rotated an additional twenty (20) degrees to fully engage the teeth 38a, 38b, 38c with the teeth 32a, 32b, 32c, etc.

Referring now to FIG. 13, the rotatably mounted shaft 22 of the locking mechanism 20 can advantageously include a spring 52 disposed in an axially extending bore 54 therein. The rotatably mounted shaft 22 also has an axially extending slot 56 in communication with the bore 54 which is adapted to receive the pin 22b of the cam means 42 therein. With this arrangement, the pin 22b of the cam means 42 is adapted for movement in the slot 56 against the biasing force of the spring 52.

Figure 20:
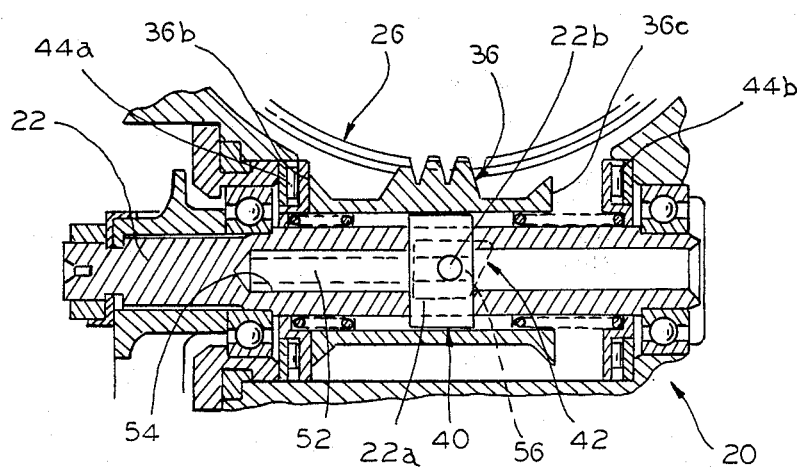
FIG. 20 is a cross-sectional view similar to FIG. 13 but in a position after system gear torque.

As shown, the pin 22b of the cam means 42 preferably extends through the pin 22a of the lost motion means 40, and the pin 22b of the cam means 42 moves axially with the pin 22a of the lost motion means 40. As a result of this arrangement, when the system gear means 26 is subjected to an external torque, e.g., by means of the manual drive hydraulic motor or output shaft (see FIG. 1). When this occurs, the pin 22b of the cam means 42 moves in the slot 56 against the biasing force of the spring 52 thereby causing the spring 52 to absorb some of the external torque until one of the spaced opposing ends 36b and 36c engages one of the thrust bearings 44a and 44b thereby grounding the torque to the housing (see, for instance, FIG. 20).

As will be appreciated, if the pin 22b is rigidly secured to the rotatably mounted shaft 22, any external torque on the system gear means 26 must be absorbed entirely by the pin 22b. This would require the pin 22b to be oversized which is undesirable, particularly in aircraft applications and the like. However, with the unique spring 52-bore 54-slot 56 arrangement as described, this drawback is eliminated.

Still more specifically, it can be seen by referring to FIG. 13 that the cam angled window 42b is in engagement with the pin 22b. In the event of a torque in the direction of the arrow, the cam angled window 42b will act directly against the pin 22b which, if rigidly secured to the rotatably mounted shaft 22, would cause the pin 22b to experience the entirety of the torque on the system gear means 26 as the cam angled window acted against the pin 22b. However, with the embodiment illustrated in FIG. 13, the torque is largely absorbed by the spring 52 in the axially extending bore 54 as the pin 22b moves in the slot 56 (see, also, FIG. 15).

Figure 16:
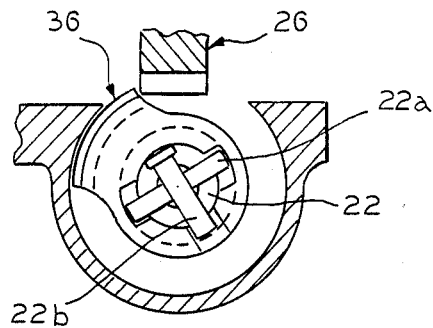
FIG. 16 is a cross-sectional view similar to FIG. 14 but rotated slightly to remove play within the operating components.
Figure 17:
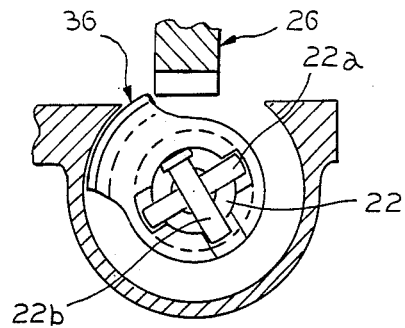
FIG. 17 is a cross-sectional view similar to FIG. 14 but rotated to the point of gear interference.
Figure 18:
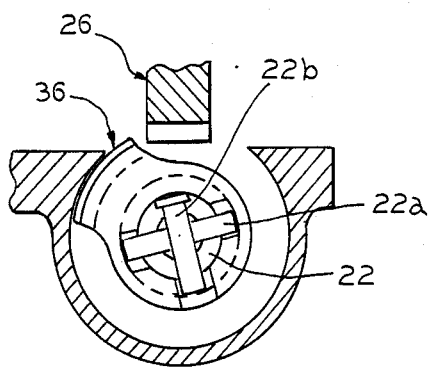
FIG. 18 is a cross-sectional view similar to FIG. 14 but rotated further to accommodate gear meshing.
Figure 19:
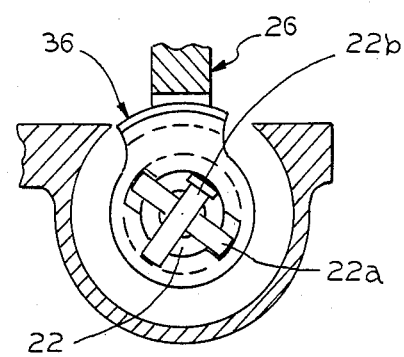
FIG. 19 is a cross-sectional view similar to FIG. 14 but rotated still further for fully engaging gears.

Referring now to FIG. 14, the pins 22a and 22b are shown in a start position of 0°. The position of the pins 22a and 22b after rotation to remove free play is illustrated in FIG. 16. The position of the pins 22a and 22b after rotation until interference of the system gear means 26 and the sector gear means 36 is illustrated in FIG. 17. The position of the pins 22a and 22b after rotation to slide the sector gear means 36 axially to a tooth space relative to the system gear means 26 is illustrated in FIG. 18. Finally, the position of the pins 22a and 22b after rotation to fully engage the system gear means 26 and the sector gear means 36 is illustrated in FIG. 19.

As will be appreciated, the locking mechanism is well suited for a mechanical transmission of a drive system. It achieves the objective of providing a mechanical lockout which will mechanically lock a drive system from operation during maintenance procedures by means of positive engagement. Moreover, the locking mechanism is entirely capable of operation regardless of index position.

While in the foregoing there has been set forth a preferred embodiment of the invention, it is to be understood that the invention is only to be limited by the spirit and scope of the appended claims.

We claim:

1. A locking mechanism for a mechanical transmission in a drive system, comprising:
   system gear means associated with said mechanical transmission, said system gear means including a plurality of equally spaced teeth completely about the periphery thereof, said system gear means having an axis of rotation and being mounted for rotation in a plane;
   a rotatably mounted shaft having an axis of rotation and being mounted for rotation in said plane, said axis of rotation extending generally tangentially of said system gear means, said rotatably mounted shaft being disposed in spaced relation to said teeth of said system gear means;
   sector gear means associated with said rotatably mounted shaft, said sector gear means including a plurality of equally spaced teeth about a portion of the periphery thereof, said sector gear means having an axis of rotation and being mounted for rotation into and out of said plane;
   said axis of rotation of said rotatably mounted shaft also comprising said axis of rotation of said sector gear means;
   lost motion means associated with said rotatably mounted shaft and said sector gear means, said lost motion means accommodating limited rotation of said rotatably mounted shaft relative to said sector gear means, said lost motion means otherwise accommodating rotation of said sector gear means with said rotatably mounted shaft; and
   cam means associated with said rotatably mounted shaft and said sector gear means, said cam means accommodating limiting axial movement of said sector gear means relative to said rotatably mounted shaft during rotation of said rotatably mounted shaft and said sector gear means, said cam means thereby accommodating tangential movement of said teeth of said sector gear means relative to said teeth of said system gear means;
   whereby said teeth of said sector gear means are automatically aligned during rotation for meshing engagement with said teeth of said system gear means.

2. The locking mechanism as defined by claim 1 wherein said sector gear means comprises a sector worm gear, said rotatably mounted shaft extending completely through said sector worm gear.

3. The locking mechanism as defined by claim 2 wherein said sector worm gear includes an elongated body portion having spaced opposing ends, said teeth of said sector worm gear being disposed on said elongated body portion intermediate said spaced opposing ends.

4. The locking mechanism as defined by claim 3 including a pair of thrust bearings mounted in confronting relation to said spaced opposing ends of said elongated body portion, said thrust bearings being spaced by a distance greater than the overall length of said elongated body portion.

5. The locking mechanism as defined by claim 4 wherein one of said spaced opposing ends has a bearing surface adapted to engage one of said thrust bearings and the other of said spaced opposing ends has a bearing surface adapted to engage the other of said thrust bearings.

6. The locking mechanism as defined by claim 3 including first biasing means cooperating with one of said spaced opposing ends for axially biasing said elongated body portion in one direction and second biasing means cooperating with the other of said spaced opposing ends for axially biasing said elongated body portion in the other direction.

7. The locking mechanism as defined by claim 3 wherein said elongated body portion includes a bore adapted to receive said rotatably mounted shaft, one of said bore and said shaft having an internal spline and the other of said bore and said shaft having an external spline, said external spline being disposed within said internal spline and defining said lost motion means associated with said rotatably mounted shaft and said sector gear means.

8. The locking mechanism as defined by claim 7 wherein said internal spline is an arcuate groove within said bore in said elongated body portion, said arcuate groove being adapted to receive said external spline therewithin, said external spline being a pin extending outwardly from said rotatably mounted shaft.

9. The locking mechanism as defined by claim 3 wherein said elongated body portion includes a bore adapted to receive said rotatably mounted shaft, one of said bore and said shaft including a cam surface and the other of said bore and said shaft including a camming member, said camming member being disposed in engagement with said cam surface and defining said cam means associated with said rotatably mounted shaft and said sector gear means.

10. The locking mechanism as defined by claim 9 wherein said cam surface is defined by a cam angled window within said bore of said elongated body portion, said cam angled window being adapted to receive said camming member therewithin, said camming member being a pin extending outwardly from said rotatably mounted shaft.

11. The locking mechanism as defined by claim 10 wherein said rotatably mounted shaft has a spring disposed in an axially extending bore therein, said rotatably mounted shaft also having an axially extending slot in communication with said bore and adapted to receive said pin of said cam means therein, said pin of said cam means being adapted for movement in said slot against the biasing force of said spring.

12. The locking mechanism as defined by claim 11 wherein said elongated body portion includes a bore adapted to receive said rotatably mounted shaft, said bore having an internal spline defined by an arcuate groove and said shaft having an external spline defined by a pin extending outwardly from said rotatably mounted shaft, said pin being disposed within said groove to define said lost motion means associated with said rotatably mounted shaft and said sector gear means.

13. The locking mechanism as defined by claim 12 wherein said pin of said cam means extends through said pin of said lost motion means, said pin of said cam means moving axially with said pin of said lost motion means when said system gear is subjected to an external torque, said pin of said cam means moving in said slot against the biasing force of said spring.

14. A locking mechanism for a mechanical transmission in a drive system, comprising:
   system gear means associated with said mechanical transmission, said system gear means including a plurality of equally spaced teeth completely about the periphery thereof, said system gear means having an axis of rotation and being mounted for rotation in a plane;
   a rotatably mounted shaft having an axis of rotation and being mounted for rotation in said plane, said axis of rotation extending generally tangentially of said system gear means, said rotatably mounted shaft being disposed in spaced relation to said teeth of said system gear means;
   sector gear means associated with said rotatably mounted shaft, said sector gear means including a plurality of equally spaced teeth about a portion of the periphery thereof, said sector gear means having an axis of rotation and being mounted for rotation into and out of said plane;
   said axis of rotation of said rotatably mounted shaft also comprising said axis of rotation of said sector gear means;
   said sector gear means comprising a sector worm gear, said rotatably mounted shaft extending completely through said sector worm gear, said sector worm gear including an elongated body portion having spaced opposing ends, said teeth of said sector worm gear being disposed on said elongated body portion intermediate said spaced opposing ends, said elongaged body portion including a bore adapted to receive said rotatably mounted shaft;
   lost motion means associated with said rotatably mounted shaft and said sector worm gear, said lost motion means accommodating limited rotation of said rotatably mounted shaft relative to said sector worm gear, said lost motion means otherwise accommodating rotation of said sector worm gear with said rotatably mounted shaft;
   said rotatably mounted shaft having an external spline and said bore having an internal spline, said external spline being disposed within said internal spline to define said lost motion means; and
   cam means associated with said rotatably mounted shaft and said sector worm gear, said cam means accommodating limited axial movement of said sector worm gear relative to said rotatably mounted shaft during rotation of said rotatably mounted shaft and said sector worm gear, said cam means thereby accommodating tangential movement of said teeth of said sector worm gear relative to said teeth of said system gear means;
   said rotatably mounted shaft including a camming member and said bore including a cam surface, said camming member being disposed in engagement with said cam surface to define said cam means;
   whereby said teeth of said sector gear means are automatically aligned during rotation for meshing engagement with said teeth of said system gear means.

15. The locking mechanism as defined by claim 14 including a pair of thrust bearings mounted in confronting relation to said spaced opposing ends of said elongated body portion, said thrust bearings being spaced by a distance greater than the overall length of said elongated body portion.

16. The locking mechanism as defined by claim 15 wherein one of said spaced opposing ends has a bearing surface adapted to engage one of said thrust bearings and the other of said spaced opposing ends has a bearing surface adapted to engage the other of said thrust bearings.

17. The locking mechanism as defined by claim 16 including first biasing means cooperating with one of said spaced opposing ends for axially biasing said elongated body portion in one direction and second biasing means cooperating with the other of said spaced opposing ends for axially biasing said elongated body portion in the other direction.

18. The locking mechanism as defined by claim 17 wherein said biasing means includes a first compression spring axially biasing said one of said spaced opposing ends in said one direction and said second biasing means includes a second compression spring axially biasing said other of said spaced opposing ends in said other direction.

19. The locking mechanism as defined by claim 17 wherein said lost motion means includes an internal spline defined by an arcuate groove within said bore in said elongated body portion, said lost motion means also being such that said arcuate groove is adapted to receive an external spline therewithin, said external spline being a pin extending outwardly from said rotatably mounted shaft.

20. The locking mechanism as defined by claim 19 wherein said cam surface is defined by a cam angled window within said bore of said elongated body portion, said cam angled window being adapted to receive said camming member therewithin, said camming member being a pin extending outwardly from said rotatably mounted shaft.

21. The locking mechanism as defined by claim 20 wherein said rotatably mounted shaft has a spring disposed in an axially extending bore therein, said rotatably mounted shaft also having an axially extending slot in communication with said bore and adapted to receive said pin of said cam means therein, said pin of said cam means being adapted for movement in said slot against the biasing force of said spring.

22. The locking mechanism as defined by claim 21 wherein said pin of said cam means extends through said pin of said lost motion means, said pin of said cam means moving axially with said pin of said lost motion means when said system gear is subjected to an external torque, said pin of said cam means moving in said slot against the biasing force of said spring.

* * * * *